(12) United States Patent
Ennis

(10) Patent No.: US 11,746,742 B1
(45) Date of Patent: Sep. 5, 2023

(54) THRUST-OPTIMIZED BLADE DESIGN FOR WIND TURBINES

(71) Applicant: National Technology & Engineering Solutions of Sandia, LLC., Albuquerque, NM (US)

(72) Inventor: Brandon Lee Ennis, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/894,821

(22) Filed: Aug. 24, 2022

Related U.S. Application Data

(60) Provisional application No. 63/237,384, filed on Aug. 26, 2021.

(51) Int. Cl.
*F03D 1/06* (2006.01)
*F03D 13/25* (2016.01)

(52) U.S. Cl.
CPC ........... *F03D 1/0633* (2013.01); *F03D 13/25* (2016.05); *F05B 2230/50* (2013.01)

(58) Field of Classification Search
CPC ..... F03D 1/0633; F03D 13/25; F05B 2230/50
See application file for complete search history.

(56) References Cited

U.S. PATENT DOCUMENTS

| | | | |
|---|---|---|---|
| 8,182,231 B2 * | 5/2012 | Corten | F03D 7/0256 416/61 |
| 10,400,743 B1 * | 9/2019 | Kelley | F03D 1/0633 |
| 2006/0232073 A1 * | 10/2006 | Corten | F03B 15/06 290/44 |
| 2011/0176926 A1 * | 7/2011 | Corten | F03D 1/0608 416/223 R |

* cited by examiner

*Primary Examiner* — Eldon T Brockman
(74) *Attorney, Agent, or Firm* — Daniel J. Jenkins

(57) ABSTRACT

A wind rotor is disclosed that produces energy optimally for a given thrust overturning moment. By designing rotors with suboptimal aerodynamic efficiency, they can have optimal thrust performance, which will reduce the substructure cost and/or enable greater energy capture for a given substructure.

24 Claims, 13 Drawing Sheets

THRUST-OPTIMIZED BLADE DESIGN FOR WIND TURBINES

CROSS-REFERENCE TO RELATED APPLICATIONS

This application claims priority to provisional patent application U.S. Ser. No. 63/237,384, entitled "THRUST-OPTIMIZED BLADE DESIGN FOR OFFSHORE WIND TURBINES" by Brandon Lee Ennis, filed Aug. 26, 2021, the disclosure of which is incorporated herein by reference in its entirety.

STATEMENT CONCERNING FEDERALLY SPONSORED RESEARCH

This invention was made with Government support under Contract No. DE-NA0003525 awarded by the United States Department of Energy/National Nuclear Security Administration. The Government has certain rights in the invention.

FIELD OF THE INVENTION

The present invention relates to the field of wind energy, and specifically to offshore wind energy and wind turbine blades having increased annual energy production for a given thrust overturning moment.

BACKGROUND OF THE INVENTION

Wind turbines are used to generate energy for both local use and to support energy grid operations. Wind turbines can be installed on concrete foundations on land, and in offshore applications having large, fixed-bottom towers connecting directly to the seabed or mounted upon large, floating structures which are moored to the seabed. For offshore wind turbines, these structural elements represent a large contribution to the resulting levelized cost of energy.

Commercial wind turbines are currently designed for optimal energy capture per turbine cost. To accomplish this goal, wind turbines are designed using the known solution from the blade-element momentum theory that maximizes the aerodynamic efficiency ($C_P$) with a design loading profile defined by an axial induction of ⅓ across the rotor. This approach is effective for land-based installations where the foundation is a small portion of installed costs but is suboptimal for offshore wind.

While land-based wind energy has become economically competitive with traditional energy generation sources in the U.S., offshore wind is not. For floating offshore wind, this difference is even more substantial where the levelized cost of energy (LCOE) is projected to be around 3-5 times more expensive than land-based wind. The turbine represents 65% of the LCOE for land-based wind sites, but the increased costs with floating offshore wind reduce this contribution to around 20%. The platform is the single largest contributor to the LCOE for floating offshore wind where mass below the water level is required to counteract the overturning moment caused by the turbine's thrust. Despite the high costs of the platform and relatively low cost of the turbine, commercial turbines for use in offshore applications are designed the same as for land-based sites.

One known wind turbine blade design methodology is disclosed in U.S. Pat. No. 10,400,743B1 issued Sep. 3, 2019 (the '743 Patent). In the '743 Patent, a process is described where the inboard and outboard sections of the wind turbine blade are configured to provide an increased load on the inboard portion of the blade and unloads the tip portion (i.e., the outboard portion) relative to a convention blade design. In order to accomplish this, the '743 Patent utilizes an inboard region induction factor of between ⅓ and ½ at a tip speed ratio of 9 and an outboard region having an induction factor of no less than zero and no greater than ⅓. However, such blade designs do not consider the thrust overturning moment of the wind turbine resulting from the design of the blade. For example, the blade designs of the '743 Patent do not provide an increase in energy capture for a given thrust overturning moment or a decrease in thrust overturning moment for the same energy production level of the wind turbine.

What is needed is a wind turbine blade designed specifically to reduce the cost of offshore wind energy by controlling the produced thrust overturning moment while maximizing the energy production.

BRIEF DESCRIPTION OF THE DRAWINGS

Wherever possible, the same reference numbers will be used throughout the drawings to represent the same parts.

SUMMARY OF THE INVENTION

Figure 1:
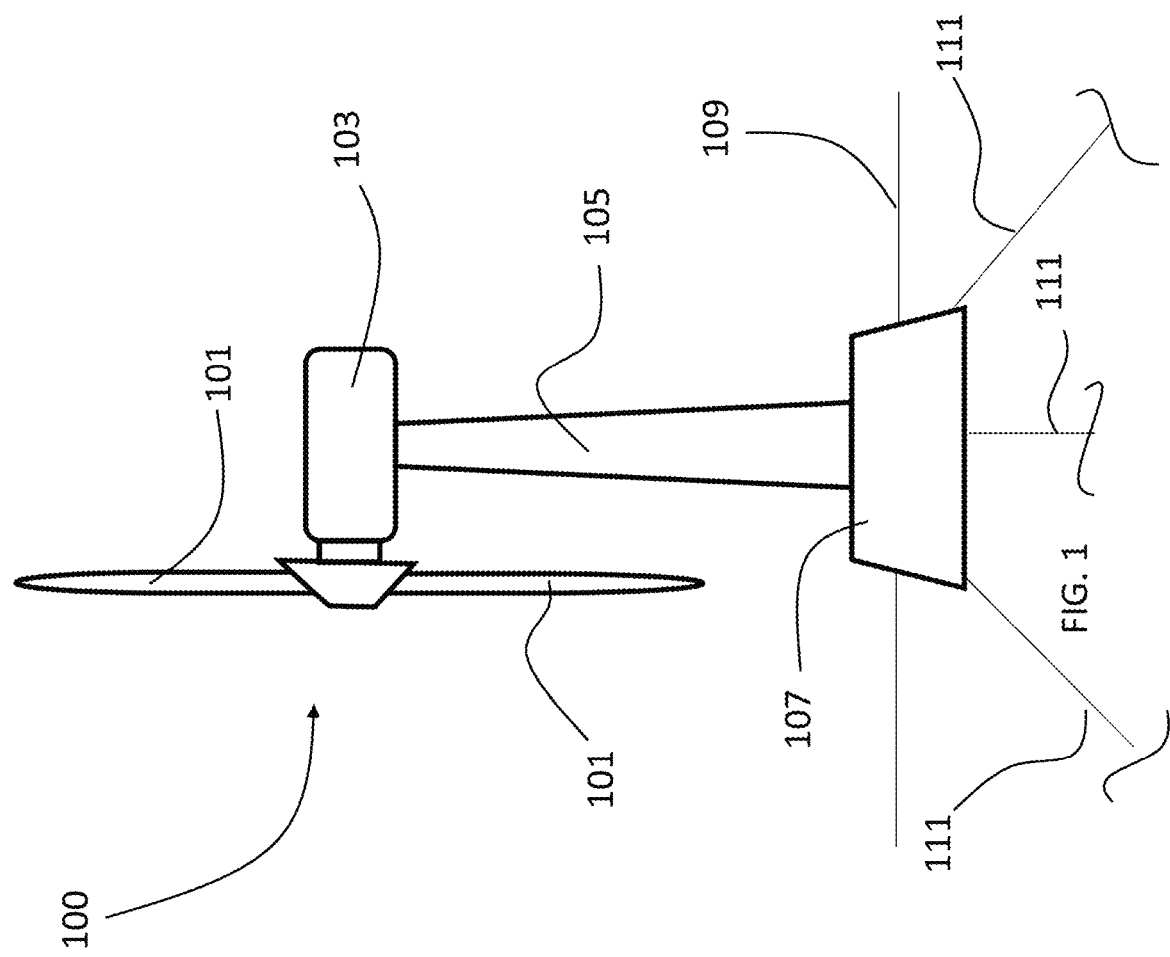
FIG. 1 schematically illustrates an offshore wind turbine according to an embodiment of the present disclosure.

The disclosure is directed to a wind turbine blade having a blade geometry that decreases loading along the inboard region of the blade while approaching aerodynamically optimal values near the tip region. The disclosed blades have a distribution of lift along the blade to produce higher torque and power for a fixed thrust overturning moment, decreasing the support structure costs and/or increasing the annual energy production for a given foundation or floating platform.

The disclosure is also directed to a wind turbine blade having an inboard region and an outboard region. The blade includes a first configuration of geometry, the first configuration including a geometry of the inboard region that provides an induction factor of between 0.1-0.25 or an induction factor of between 0.1-0.15 and a geometry of the outboard region that provides an induction factor of between 0.15-0.33. A first thrust overturning moment is applied to a tower base of a wind turbine onto which the wind turbine blade is installed from the first configuration. The thrust overturning moment applied to the tower base from the first configuration is less than a second thrust overturning moment corresponding to a second configuration of wind turbine blades having a geometry of the inboard region that provides an induction factor of 0.33 and a geometry of the outboard region that provides an induction factor of 0.33.

The disclosure is also directed to a wind turbine having a plurality of wind turbine blades attached to a hub. Each of the blades includes an inboard region and an outboard region. Each blade has a first configuration of geometry. The first configuration includes a geometry of the inboard region that provides an induction factor of between 0.1-0.25 or an induction factor of between 0.1-0.15 and a geometry of the outboard region that provides an induction factor of between 0.15-0.33. A tower extends from the hub to a tower base. A first thrust overturning moment is applied to the tower base from the first configuration that is less or equal to a second thrust overturning moment corresponding to a second configuration of wind turbine blades having a geometry of the inboard region that provides an induction factor of 0.33 and a geometry of the outboard region that provides an induction factor of 0.33.

The disclosure is also directed to a method of making a wind turbine. The method includes forming a wind turbine blade having an inboard region and an outboard region having a first configuration of geometry. The first configuration of geometry includes a geometry of the inboard region that is configured to provide an induction factor of between 0.1-0.25 or an induction factor of between 0.1-0.15 and a geometry of the outboard region that is configured to provide an induction factor of between 0.15-0.33. The wind turbine blade is provided to a hub. The hub is attached to a tower, which is attached to a tower base. A first thrust overturning moment is applied to the tower base from the first configuration that is less or equal to a second thrust overturning moment corresponding to a second configuration of wind turbine blades having a geometry of the inboard region that provides an induction factor of 0.33 and a geometry of the outboard region that provides an induction factor of 0.33.

The disclosure is also directed to a wind turbine having wind turbine blades having a blade geometry that decreases loading on the inboard region of the blade while approaching aerodynamically optimal values near the tip region.

The disclosure is also directed to a wind farm having a wind turbine having wind turbine blades having a blade geometry that decreases loading on the inboard region of the blade while approaching aerodynamically optimal values near the tip region.

According to an embodiment of the disclosure, a turbine blade is disclosed that includes an inboard region and an outboard region. The inboard region has an average induction factor of between 0.1 and 0.25, and the outboard region has an average induction factor between 0.15 and 0.33.

According to another embodiment of the disclosure, a wind turbine is disclosed that includes at least one turbine blade having an inboard region; and an outboard region. The inboard region has an average induction factor of between 0.1 and 0.25, and the outboard region has an average induction factor between 0.15 and 0.33.

According to another embodiment of the disclosure, a wind farm is disclosed having two or more wind turbines having at least one wind turbine blade including an inboard region and an outboard region. The inboard region has an average induction factor of between 0.1 and 0.25, and the outboard region has an average induction factor between 0.15 and 0.33.

An advantage of the disclosed blade geometry is that wind turbines using the disclosed blade geometry will have a higher ratio of annual energy production per thrust overturning moment compared to the traditional design approach which will increase the energy production for a given foundation and reduce the system levelized cost of energy. Traditional blade design uses an induction of ⅓ along the blade, following the known optimum aerodynamic solution.

Another advantage would be that wind turbine blades can be longer for a given platform design to increase the annual energy production, which is proportional to the blade length squared.

Other features and advantages of the present invention will be apparent from the following more detailed description of the preferred embodiment, taken in conjunction with the accompanying drawings which illustrate, by way of example, the principles of the invention

DETAILED DESCRIPTION OF THE INVENTION

In this application, the following terms are defined as follows:

Induction or induction factor is the percentage that the axial velocity is slowed down relative to the incoming wind at the rotor plane. It is conventionally defined either as an azimuthal average or relative to the blade. The ranges of induction factor listed in this disclosure are in reference to values predicted by a conventional implementation of blade element momentum theory and includes equivalent ranges from other analysis methods.

Wind turbine rotors are designed for aerodynamically optimal performance for land-based installations, where the substructure costs are low. However, this standard design approach is suboptimal for offshore wind, and particularly for floating offshore wind. For offshore wind, the substructure or floating platform costs are high relative to the turbine costs. The presently disclosed approach is one which produces energy optimally for a given thrust overturning moment. By designing rotors with suboptimal aerodynamic efficiency, they can have more optimal thrust performance, which will reduce the substructure cost or enable greater energy capture for a given substructure. The precise solution to this optimization depends on the system characteristics but it will result in an optimal rotor loading profile for this better objective with an inboard region has an average induction factor of between 0.1 and 0.25, and an outboard region has an average induction factor between 0.15 and 0.33 to the standard design approach which uses a design axial induction of 0.33. This will result in substantially different turbine designs than what are being produced commercially and in a lower system levelized cost of energy for offshore wind.

FIG. 1 illustrates a wind turbine 100 according to an embodiment of the disclosure. As can be seen in FIG. 1, the wind turbine 100 includes three blades 101 attached to a hub 103, which is attached to a tower 105. The tower 105 extends to a tower base 107. While not so limited, the tower base 107 shown in FIG. 1 includes a floating base 107. The floating tower base 107 includes a portion above and a portion below the water line 109. Tethers 111 attach to the tower base 107 and extend to the floor of the body of water, such as the seafloor. The blades 101 include a configuration of blade geometry for each of the inboard and outboard regions that provides a greater energy capture per thrust overturning moment at the base 107. In this exemplary embodiment, the wind turbine 100 has three blades 101. In other embodiments, the wind turbine 100 may have more or less than three blades 101. For example, the wind turbine 100 may include two, three, four or five blades.

Figure 2:
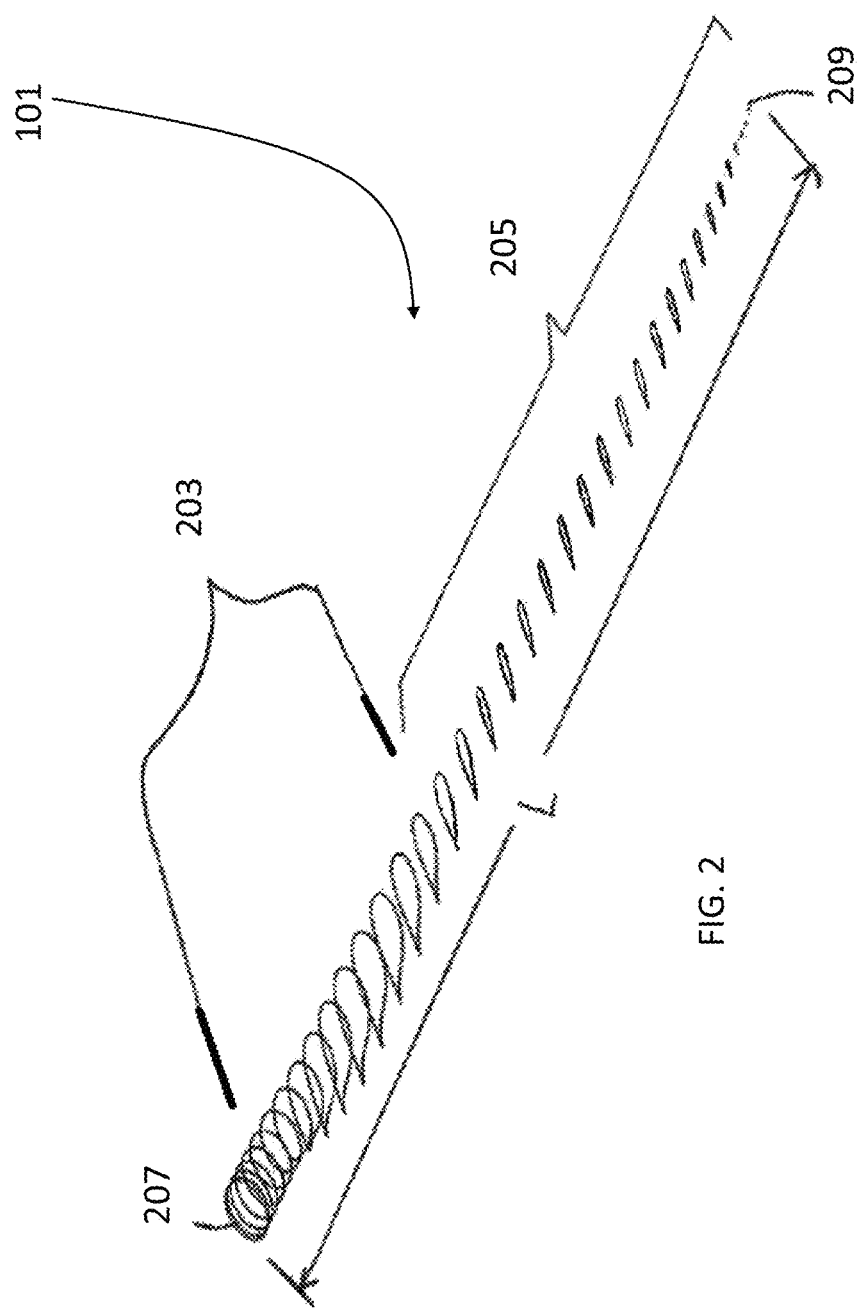
FIG. 2 schematically illustrates wind turbine blade according to an embodiment of the present disclosure.

FIG. 2 illustrates an embodiment of a wind turbine blade 101 according to the present disclosure. Blade 101 has a blade geometry having a chord, thickness and twist that correspond to a geometry that provides a particular induction factor. As can be seen in FIG. 2, the blade 101 includes an inboard region 203 and an outboard region 205 disposed between a base blade base 207 and a tip 209. The inboard region 203 is 0% to 60% of the blade span and the outboard region is 60% to 100% of the blade span.

Figure 3:
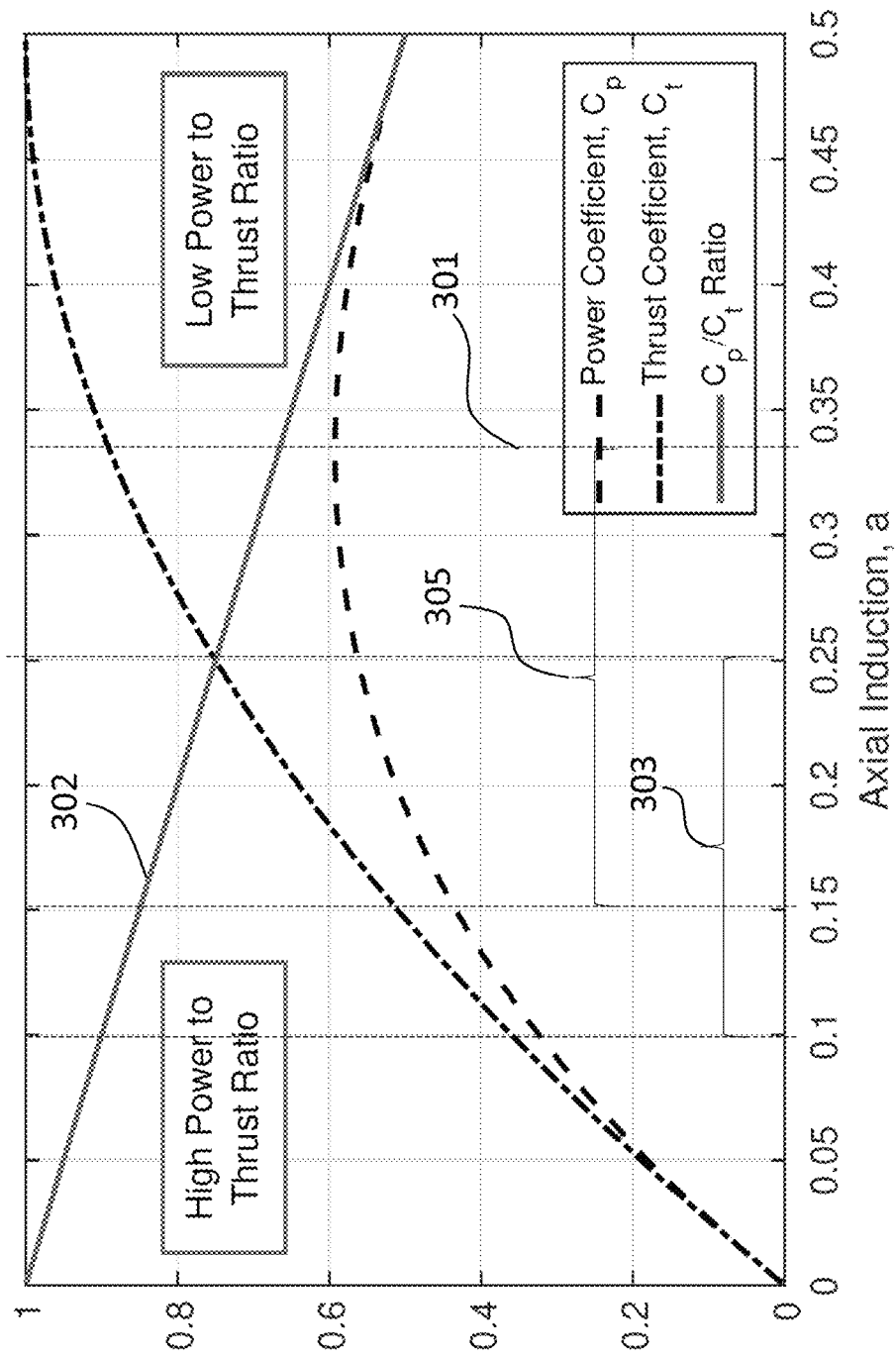
FIG. 3 shows a graph displaying a relationship between aerodynamic efficiency (Cp) and thrust generation coefficient (Ct) as a function of a constant loading profile (axial induction, a).

FIG. 3 shows a relationship between aerodynamic efficiency (Cp) and thrust generation (Ct) as a function of a constant loading profile (axial induction, a). Wind turbines are designed for the aerodynamic optimal solution 301, a=⅓, from the illustrated blade element momentum theory results which maximizes Cp. This known optimal solution 301 has worked for land-based wind installations, where the foundation costs are low relative to the turbine capital costs but is a suboptimal design approach for scenarios where support structure costs can dominate the levelized cost of energy, such as with offshore wind. The power-thrust coefficient 302 shows the relationship between the power and thrust coefficients, and the optimal relationship of power to thrust force is found at an axial induction value approaching zero (for a constant induction profile). However, a near-zero loading profile is infeasible in addition to requiring a near infinite blade length to capture meaningful amounts of energy. When the blade length increase, the location of the blade rotational axis must also increase further from the base of the tower 105 and this means that the reduced thrust force is now centered at an increased height. The product of the thrust force and center of pressure height of the force, termed as the thrust overturning moment, is the actual load that matters. The present disclosure solves for the optimal balance between the induction profile and blade length (along with the resulting hub height) such that an optimal level of energy production is accomplished for a fixed thrust overturning moment.

FIG. 3 indicates the relationship between aerodynamic efficiency and thrust force generation (shown as power-thrust coefficient 302, which is the ratio between Cp and Ct). To minimize the thrust force of a rotor, the solution to the blade element momentum theory moves towards zero loading along the blade, indicating that the turbine with the lowest thrust force (note, not thrust moment) would have an infinitely long blade with near-zero aerodynamic loading; a non-physical solution. In addition, FIG. 3 shows the design induction parameters for a blade 101 according to the present disclosure. For example, the inboard region has an average induction factor, inboard design induction factor 303 of between 0.1 and 0.25, and an outboard region has an average induction factor, outboard design induction factor 305 of between 0.15 and 0.33

The thrust force doesn't independently drive the design for offshore wind support structures/platforms, but rather the overturning moment produced from the thrust force at a distance above the support structure/platform. This eliminates the non-physical infinite blade length solution, where there is a tradeoff between lightly loaded, long blades and the resulting hub height/center of pressure that equally contributes to the thrust-derived overturning moment, as shown in Equation 1 where the thrust overturning moment is defined as the product of the thrust force and the turbine hub height (rotor radius plus offset). This maximum thrust overturning moment occurs at the turbine's rated wind speed, defined by Equation 2 based on the specific power (rated power divided by swept area) and the aerodynamic efficiency (Cp).

$$M_T = C_{T,rated} * 1/2 \rho V_{rated}^2 \pi R^2 * (R + 20m) \tag{1}$$

$$V_{rated} = \left(2 \frac{SP}{\rho * C_{P,rated}}\right)^{1/3} \tag{2}$$

This invention designates an approach for design of the wind turbine blade loading profile such that it captures energy optimally for a fixed thrust overturning moment to either reduce offshore foundation/platform costs and/or increase energy capture for optimal reduction of the levelized cost of energy for offshore wind. The annual energy production is a function of the aerodynamic efficiency (Cp), the blade length and rotor swept area (A) and the site wind speed distribution (c, shown assuming a Rayleigh distribution) as shown in the exemplary Equations 3-4.

$$AEP = t_{year} \int_{V_{in}}^{V_{out}} P(V) pr(V) dV \tag{3}$$

$$AEP/t_{year} = \int_{V_{in}}^{V_{rated}} C_P * 1/2 \rho V^3 A * \frac{2}{c^2} e^{-V^2/c^2} dV + \int_{V_{rated}}^{V_{out}} P_{rated} * \frac{2}{c^2} e^{-V^2/c^2} dV \tag{4}$$

Figure 4:
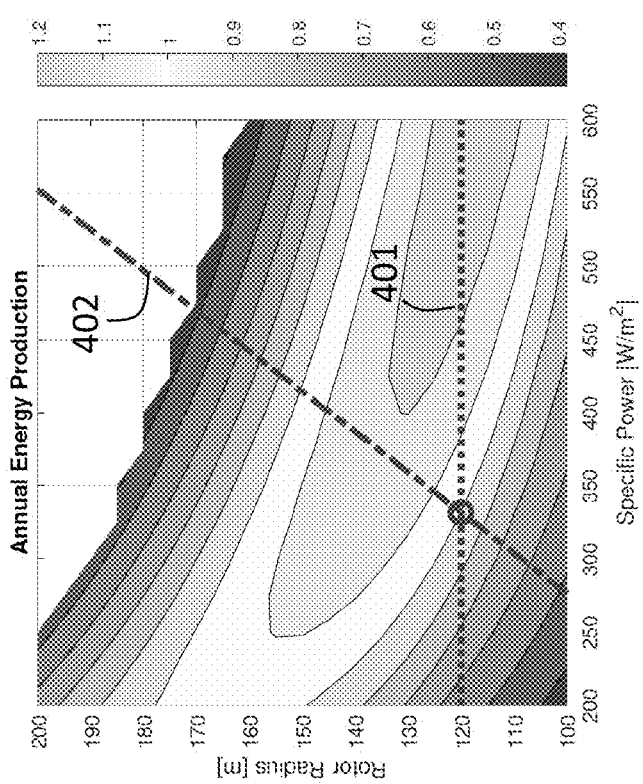
FIG. 4 shows a graph displaying a relationship between the annual energy production for a constant peak thrust overturning moment (normalized by the aerodynamic optimal solution with a=⅓ for a 15 MW reference turbine with a 120-meter rotor radius).

FIG. 4 illustrates an exemplary solution using a constant loading profile across the wind turbine blade to maximize the energy production while producing the same thrust overturning moment as the traditional design approach. This exemplary case reveals the relative energy capture compared to the traditional baseline design (a=⅓), plotted versus blade length (rotor radius) and turbine design specific power (rated power divided by the swept area). These results indicate the ability to increase energy capture by 20-25% compared to the traditional design approach by using the approach detailed in this disclosure, for this exemplary case of constant loading along the blade span.

Figure 5:
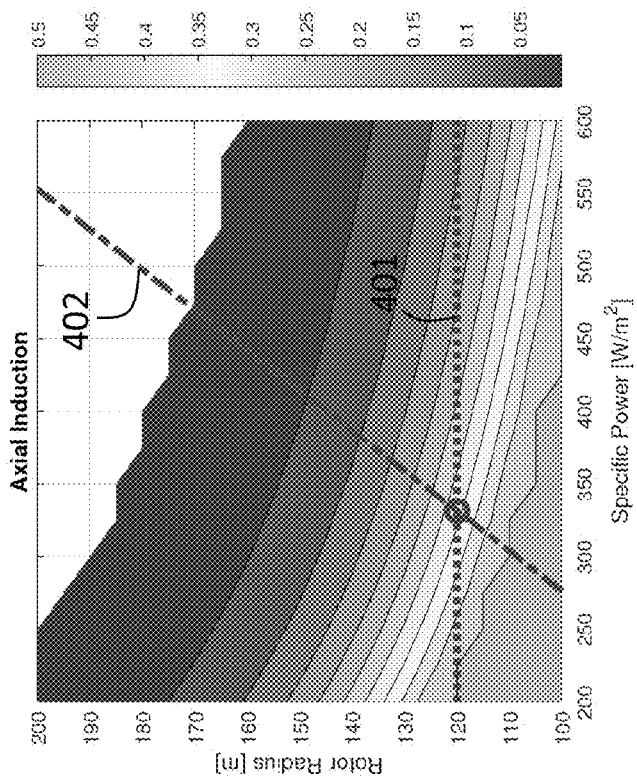
FIG. 5 shows a graph displaying an exemplary solution using a constant loading profile across the wind turbine blade that maximizes the energy production while not exceeding the thrust overturning moment of reference turbine using the traditional design approach.

FIG. 5 shows the associated exemplary constant loading (axial induction) associated with the maximum energy capture as a function of blade length and specific power is shown in FIG. 4. For the region in FIG. 5 where a 20-25% improvement in annual energy production (AEP) is found, the associated induction profile has a constant axial induction of between a=0.1 and a=0.2, compared to a=0.33 in traditional designs with optimal aerodynamic efficiency. FIGS. 4 and 5 show constant rotor radius exemplar 401 where the reference thrust overturning moment is not exceeded. In addition, FIGS. 4 and 5 show constant ratio of rotor radius to specific power exemplar 402 where the reference thrust overturning moment is not exceeded. Constant rotor radius exemplar 401 and constant ratio of rotor radius to specific power exemplar 402 show a maximized AEP without exceeding the reference thrust overturning moment. Those skilled in the art can easily interpret the use a radially varying induction profile with the same objectives as outlined in the present disclosure for a more optimal approach to be deployed which will still result in low loading compared to the standard aerodynamically optimal design approach. Equations 5 and 6 show the radially varying contributions of energy capture ($C_p$) and thrust force ($C_t$) as a function of blade span ($\mu=r/R$). The actual implementation of the present disclosure is to optimize a radially varying loading profile (axial induction, a) for the disclosed optimal design approach as described above.

$$C_P = \frac{P}{1/2\rho V^3 A} = 8\int_0^1 a(1-a)^2 \mu d\mu \quad (5)$$

$$C_T = \frac{T}{1/2\rho V^2 A} = 8\int_0^1 a(1-a) \mu d\mu \quad (6)$$

Figure 6:
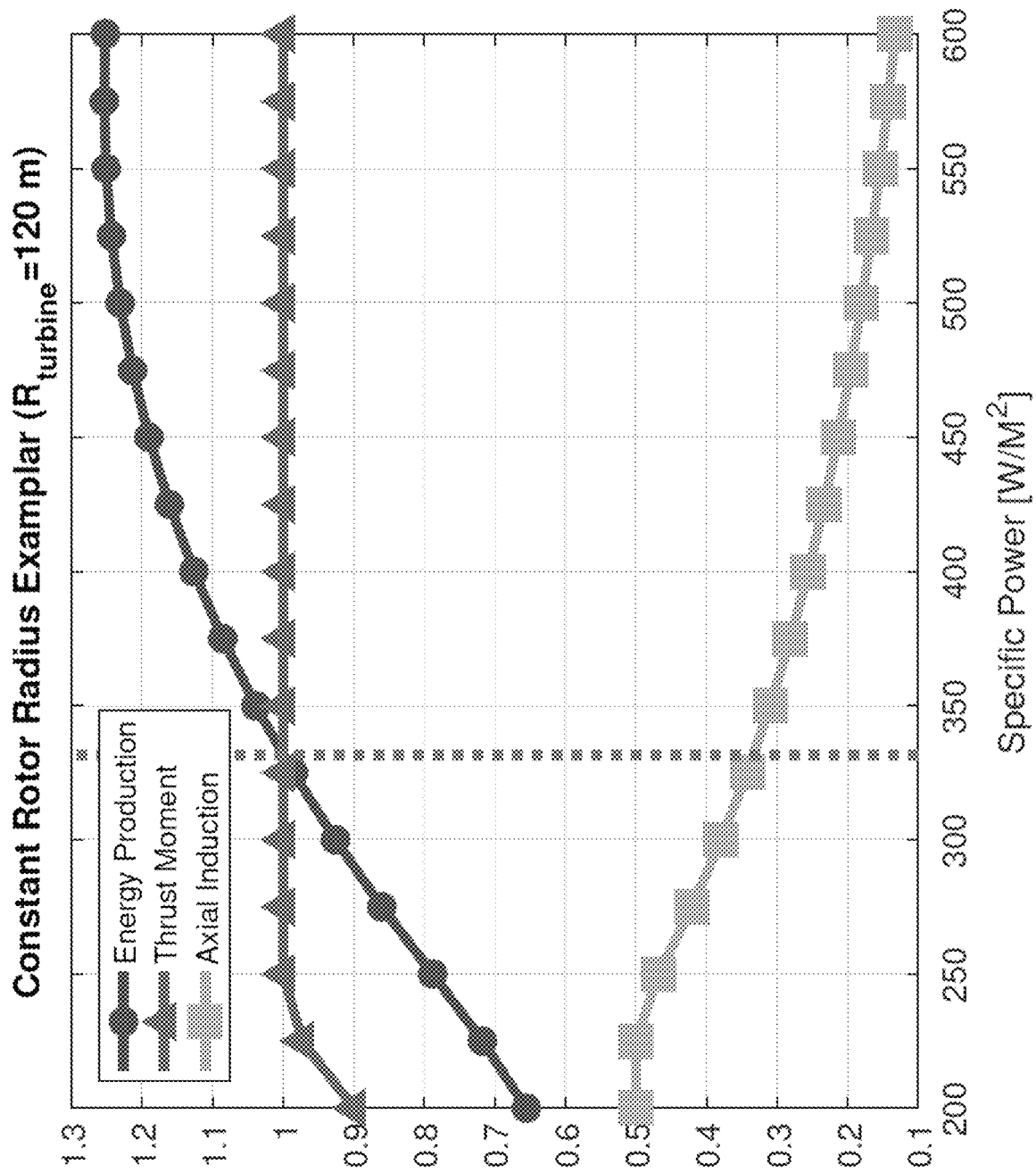
FIG. 6 shows a graph displaying the constant radius results from FIG. 5 where energy production is maximized for the thrust-optimized blade design while maintaining a thrust overturning moment that is at or below the reference value.
Figure 7:
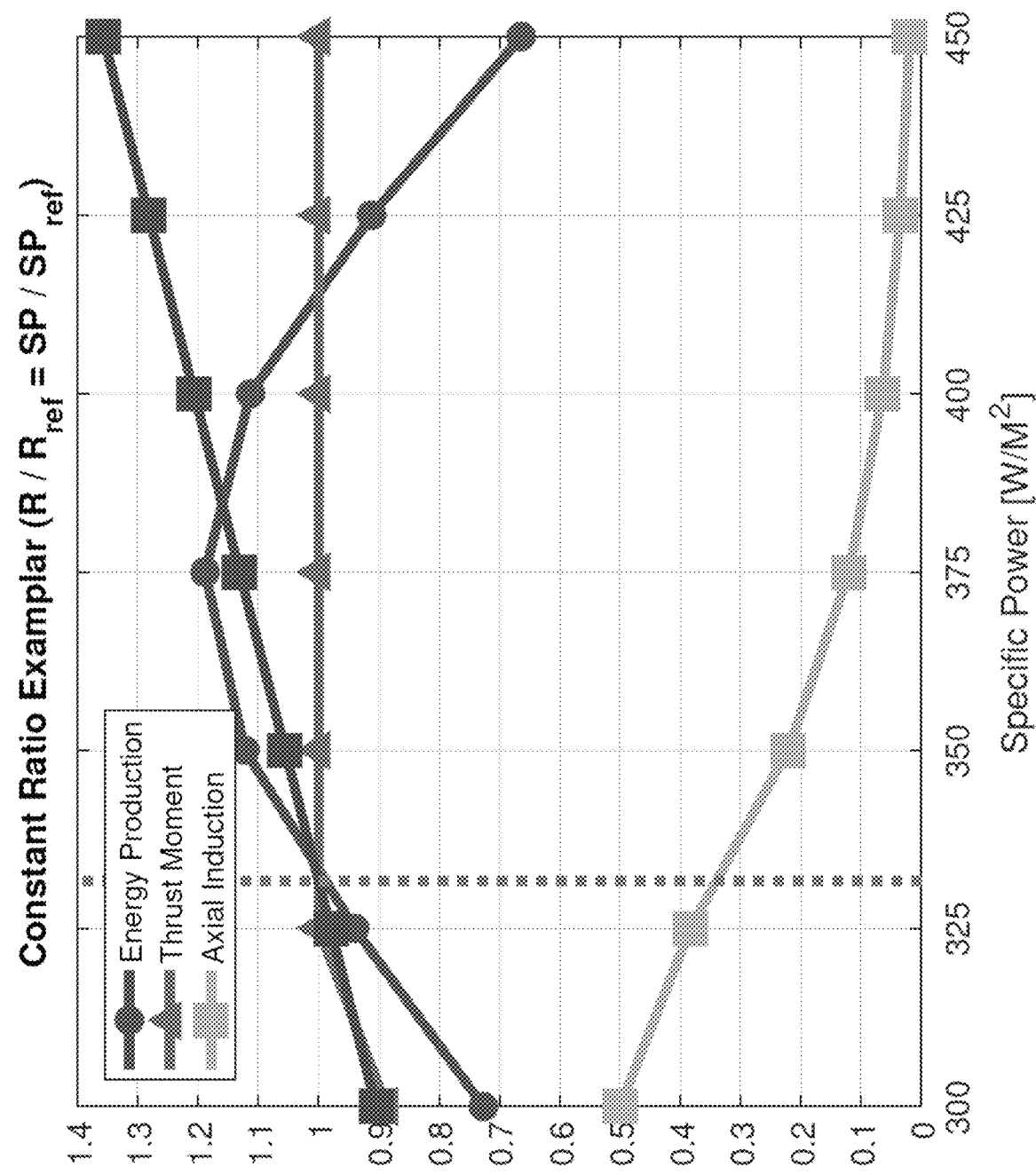
FIG. 7 shows a graph displaying the results from the second exemplar highlighted on FIG. 5, where a constant ratio of rotor radius to specific power is maintained.
Figure 8:
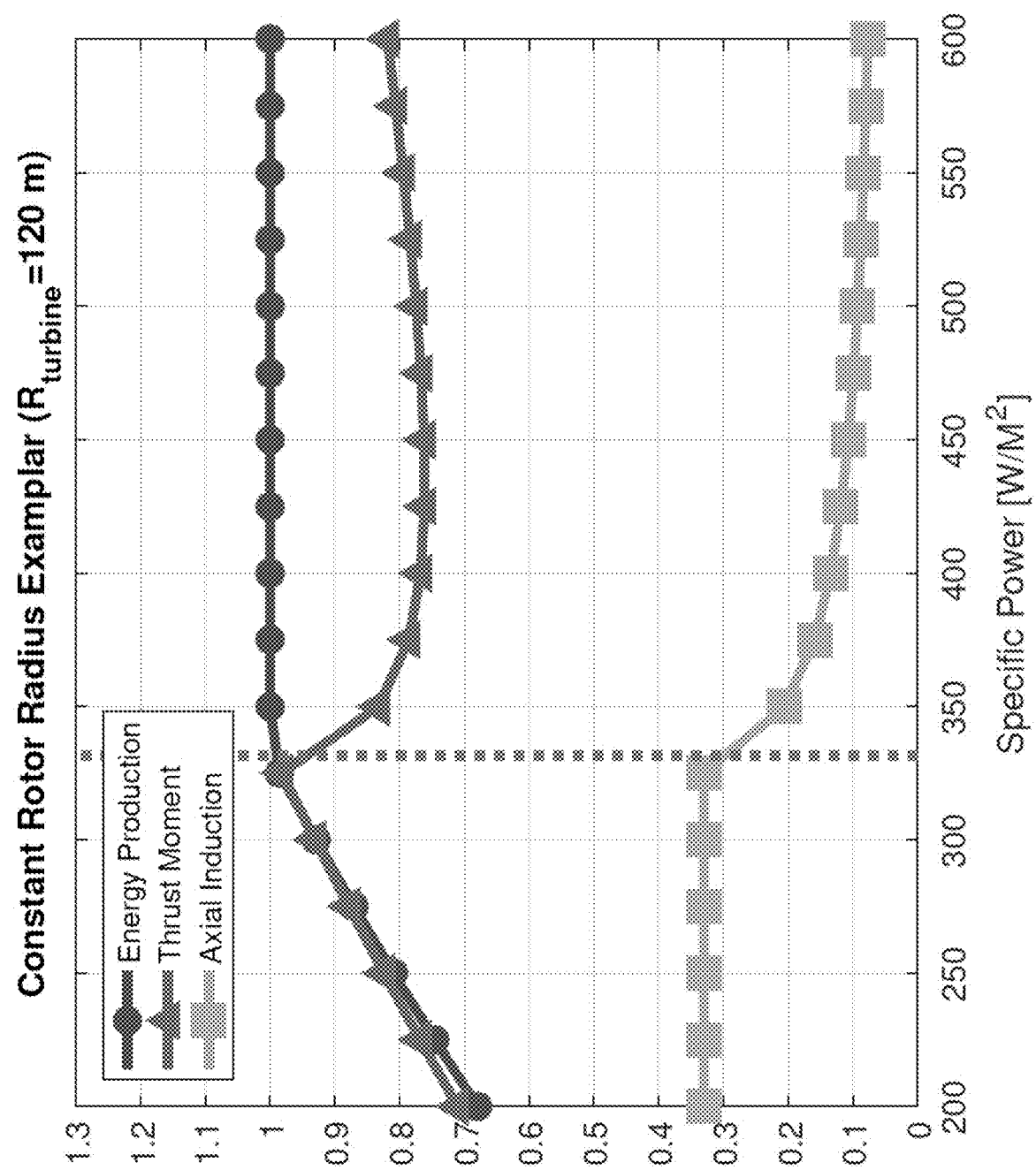
FIG. 8 shows an alternate design approach where a constant energy production is maintained and instead the thrust overturning moment is minimized.

FIG. 6 shows a graph displaying the constant radius results from FIG. 5 where energy production is maximized for the thrust-optimized blade design while maintaining a thrust overturning moment that is at or below the reference value. A 25% increase in energy production is achieved by reducing the rotor loading (axial induction) to a=0.15 and increasing the specific power of the design. Using the traditional design approach would increase the energy production with specific power but would also increase the thrust overturning moment. FIG. 7 shows the results from the second exemplar (i.e., constant ratio of rotor radius to specific power exemplar 402) highlighted on FIG. 5, where a constant ratio of rotor radius to specific power is maintained. This combination of increasing the rotor radius and specific power results in a maximum energy production increase of 19% with a rotor radius increase of 13% and a slightly higher specific power with a constant axial induction profile of a=0.23. FIG. 8 shows an alternate design approach where a constant energy production is maintained and instead the thrust overturning moment is minimized. A 24% reduction in thrust overturning moment is achieved by reducing the rotor loading to a=0.12 and increasing the specific power of the design.

Embodiment of the present disclosure includes a wind turbine blade and a wind turbine that provides an improved energy capture per thrust overturning moment at the tower base. The improved energy capture is provided by providing a blade having an inboard region and an outboard region having a particular configuration of geometry. For example, each blade may have a first configuration of geometry including a geometry of the inboard region that provides an induction factor of between 0.1-0.25 or an induction factor of between 0.1-0.15 and a geometry of the outboard region that provides an induction factor of between 0.15-0.33. The wind turbine according to the present disclosure includes a tower extending from the hub to a tower base. The tower base is subjected to a thrust moment or a thrust overturning moment when in operation. The first thrust overturning moment is applied to the tower base from the first configuration of geometry of the wind turbine blades. The first thrust overturning moment is less than a second thrust overturning moment corresponding to a second configuration of wind turbine blades having a geometry of the inboard region that provides an induction factor of 0.33 and a geometry of the outboard region that provides an induction factor of 0.33.

In one embodiment, the energy capture per thrust overturning moment applied to the tower base of the first configuration according to the present disclosure is greater than the second configuration according to a known blade design. For example, the energy capture per thrust overturning moment of the first configuration may be at least 5% greater, 10% greater or 20% greater than the second configuration.

In one embodiment, the thrust overturning moment applied to the tower base of the first configuration according to the present disclosure is less than the second configuration according to a known blade design. For example, the energy capture per thrust overturning moment of the first configuration may be at least 5% less, 10% less or 20% less than the second configuration.

In one embodiment, the tower base for a wind turbine having the first configuration according to the present disclosure is smaller than the tower base for a wind turbine having the second configuration according to a known blade design. The required foundation mass, and associated cost, for a wind turbine foundation is driven by a combination of the turbine weight and the overturning moment that the foundation must resist to keep the turbine upright. The overturning moment caused by the aerodynamic forces (thrust) on the rotor is the most meaningful force that drives the foundation design, particularly for large offshore turbines. By reducing the thrust overturning moment, while maintaining the energy production revenue, the foundation costs can be reduced through limiting the amount of foundation material volume and mass required to resist the overturning loads.

In another embodiment of the present disclosure a method of making a wind turbine includes forming a wind turbine blade having an inboard region and an outboard region having a first configuration of geometry. The first configuration of geometry includes a geometry of the inboard region that is configured to provide an induction factor of between 0.1-0.25 or an induction factor of between 0.1-0.15 and a geometry of the outboard region that is configured to provide an induction factor of between 0.15-0.33. The wind turbine blade is provided to a hub. The hub is attached to a tower, which is attached to a tower base. A first thrust overturning moment is applied to the tower base from the first configuration that is less or equal to a second thrust overturning moment corresponding to a second configuration of wind turbine blades having a geometry of the inboard region that provides an induction factor of 0.33 and a geometry of the outboard region that provides an induction factor of 0.33.

The loading profile according to the present disclosure (axial induction, a) will be identified as a function of blade span ($\mu=r/R$) to maximize the energy capture for a fixed thrust overturning moment. The power and thrust coefficients as functions of a radially varying loading profile are shown in the following equations, which will be used for the proposed optimization studies:

$$C_P = \frac{P}{1/2\rho V^3 A} = 8\int_0^1 a(1-a)^2 \mu d\mu$$

$$C_T = \frac{T}{1/2\rho V^2 A} = 8\int_0^1 a(1-a) \mu d\mu$$

The axial induction, a, is optimized as a function of blade span to minimize system LCOE by defining the relationships with system costs and energy capture. The induction profile, $\alpha(\mu)$, is then used to determine the wind turbine blade geometry parameters of chord, c, and twist, $\beta_0 = \Phi - \alpha_{des}$, for a prescribed family of airfoils (at design angles of attack, $\alpha_{des}$) by solving the set of equations below. The airfoil placement and resulting chord profile fix the blade thickness profile which drives the structural efficiency, which relates to the thickness squared.

$$\frac{a}{1-a} = \frac{Bc}{2\pi r} \frac{(C_L + C_D \tan\phi)}{4F \tan\phi \sin\phi} \quad \frac{a'}{1+a'} = \frac{Bc}{2\pi r} \frac{(C_L \tan\phi - C_D)}{4F \sin\phi}$$

$$\tan\phi = \frac{V(1-a)}{\Omega r(1+a')} = \frac{1(1-a)}{\lambda\mu(1+a')}$$

Figure 9:
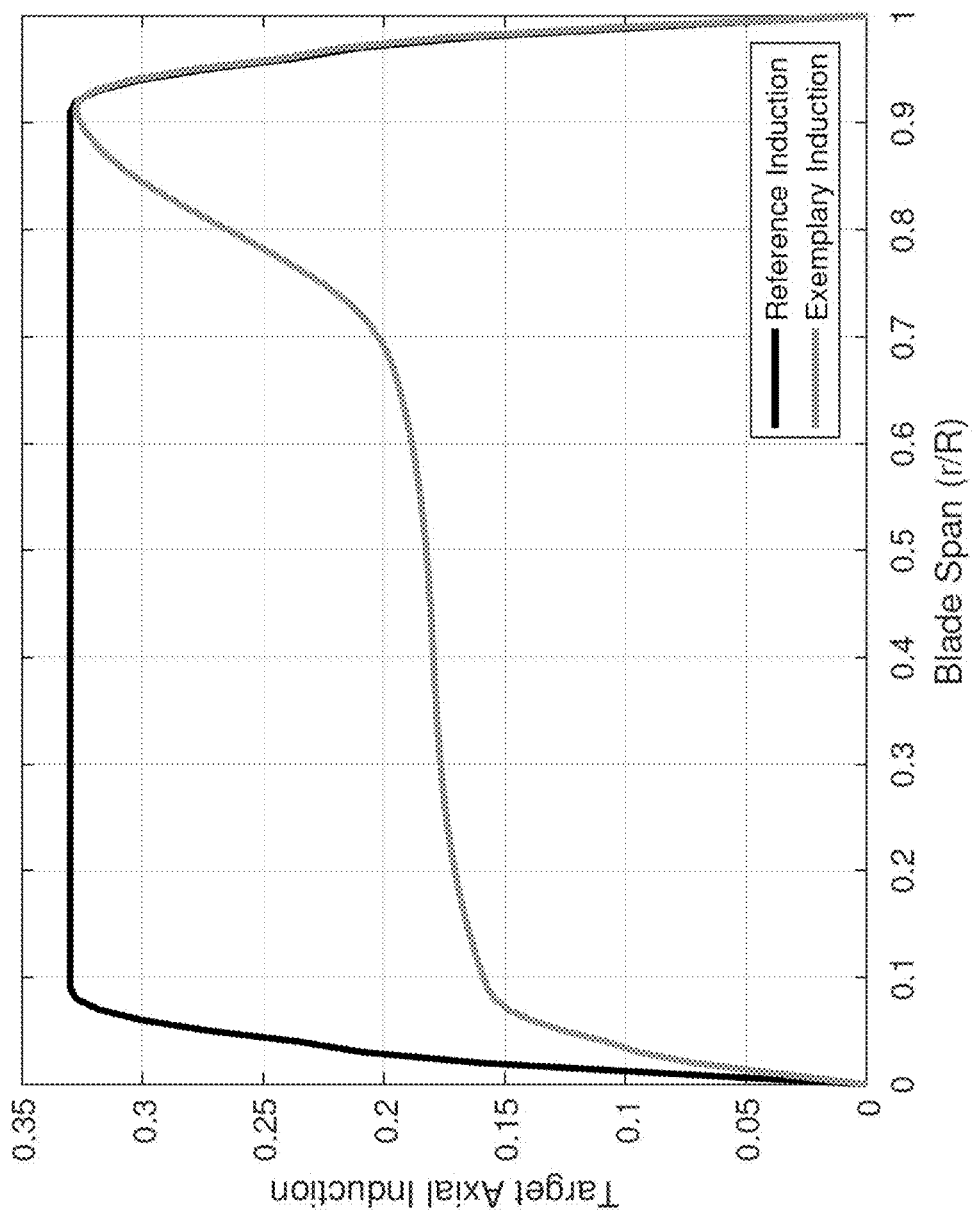
FIG. 9 shows a graph displaying an embodiment of an optimal radially varying loading profile (axial induction) according to the present disclosure, compared to the traditional/reference design approach

FIG. 9 illustrates an embodiment of an optimal radially varying loading profile (axial induction) according to the present disclosure, compared to the traditional/reference design approach. The disclosed blades will have lower loading profiles over much of the blade length compared to the known aerodynamically optimal solution. The solution for the reduced loading profile, inventive design will depend on various system specifications and on the design site classification but will have a radially varying induction profile similar to the exemplary in FIG. 9. Aerodynamic loading is reduced on the inboard region, in favor of closer to optimal aerodynamic loading in the outboard region of the blade where the aerodynamic forces contribute more meaningfully to the generator torque (due to the mechanical advantage at the larger radii).

Figure 10:
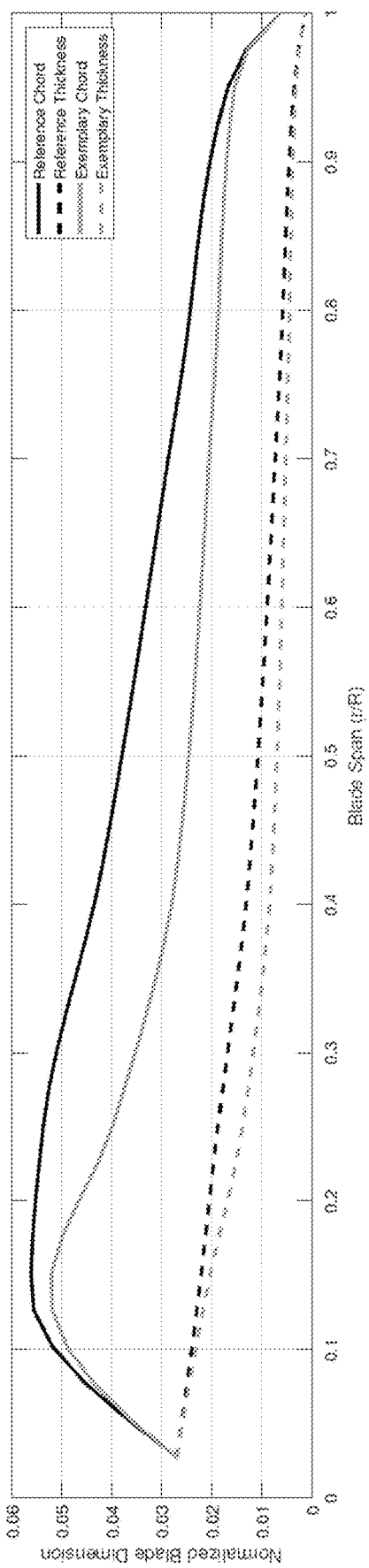
FIG. 10 shows a graph displaying an embodiment of a wind turbine blade's dimensions according to the present disclosure, compared to the traditional/reference design approach (using the axial induction profile in FIG. 9).
Figure 11:
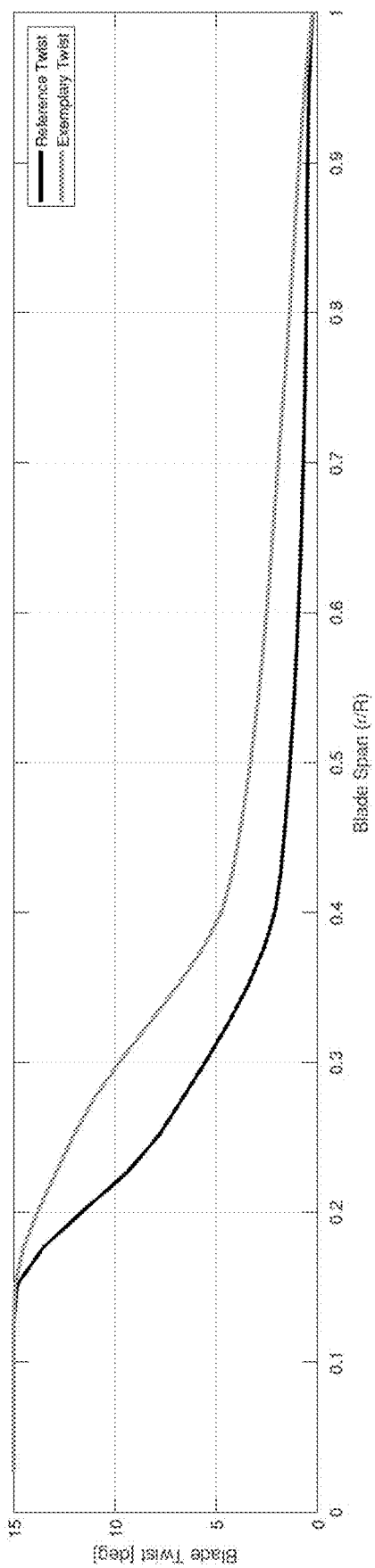
FIG. 11 shows a graph displaying an embodiment of a wind turbine blade's twist profile according to the present disclosure, compared to the traditional/reference design approach.

FIG. 10 illustrates an embodiment of a wind turbine blade's dimensions according to the present disclosure, compared to the traditional/reference design approach. To accomplish the reduced loading profile, a combination of airfoil placement along the blade, reduction in chord length, reduction in blade twist angle, and/or reduction in blade pitch angle in operation compared to traditional wind turbine blades can be utilized. Those skilled in the art will easily interpret design changes to realize the target loading profiles that are within this disclosure's claims. FIG. 11 illustrates an embodiment of a wind turbine blade's twist profile according to the present disclosure, compared to the traditional/reference design approach. For this exemplary design, the same airfoil placement and design angle of attack for the airfoil family was used as the reference wind turbine. By solving the set of blade design equations above, a smaller chord profile is derived with a slightly higher twist (due to the decrease in the axial induction profile). The exemplary blade with thrust-optimized performance is more slender and as a result has a smaller thickness profile and reduced overall surface area in the blade design.

Figure 12:
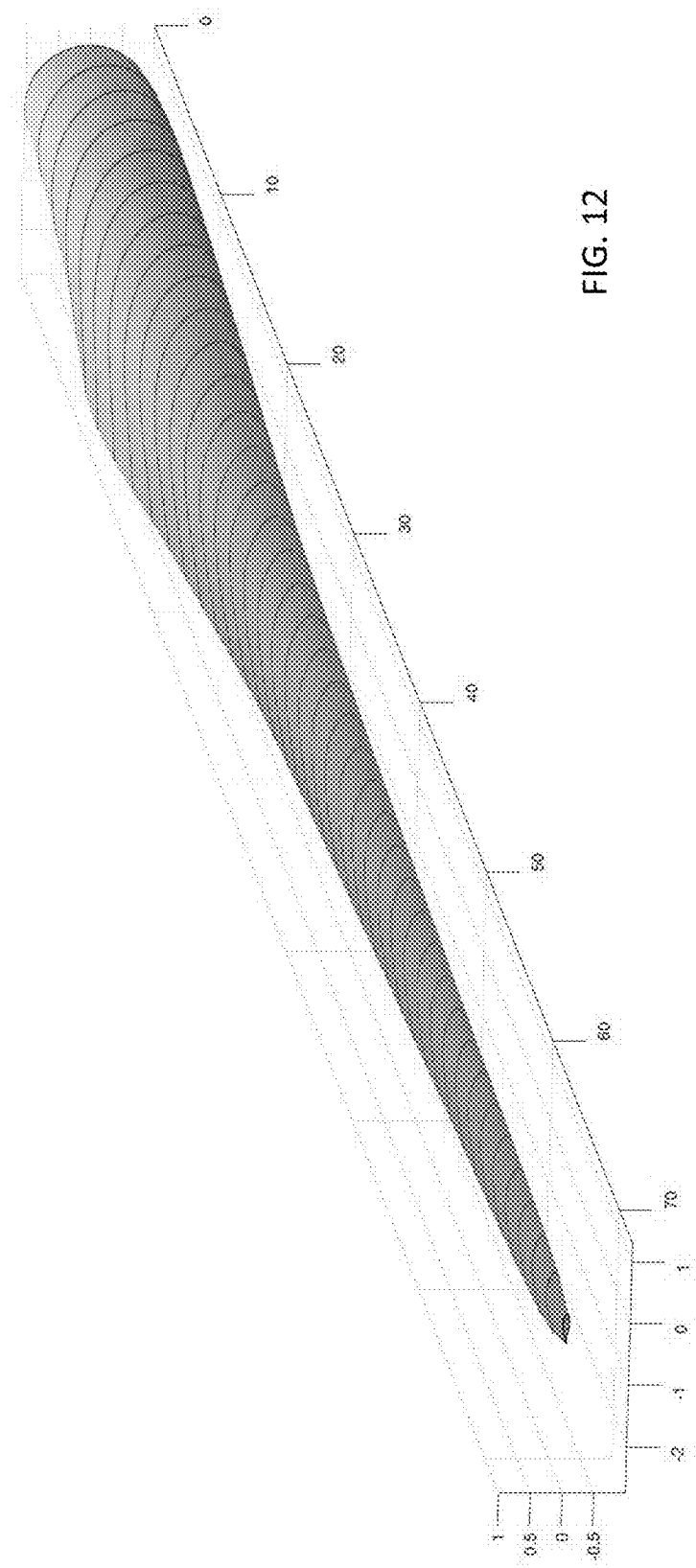
FIG. 12 shows a graph displaying a known wind turbine blade profile designed purely for maximizing aerodynamic efficiency.
Figure 13:
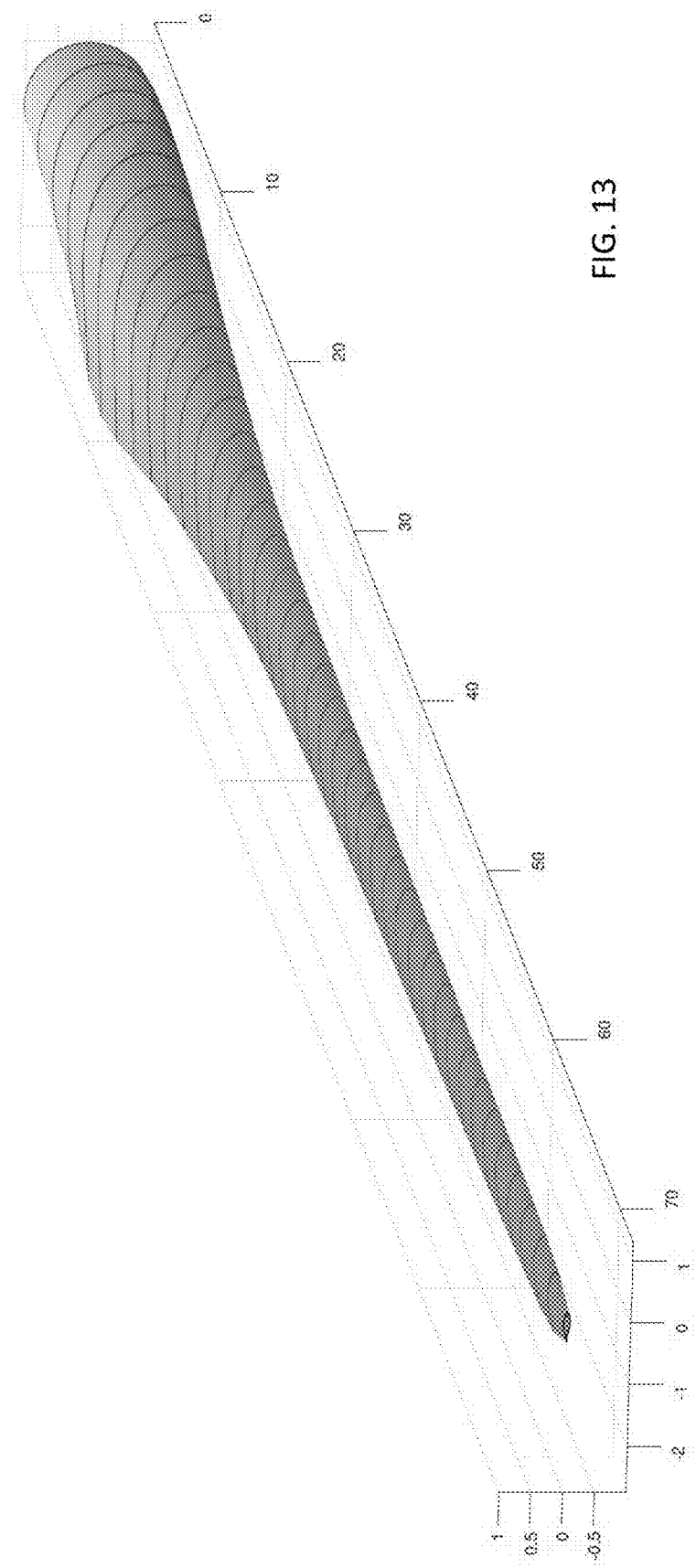
FIG. 13 shows a graph displaying an exemplary wind turbine blade profile according to an embodiment of the disclosure, designed for maximizing energy capture for a fixed thrust overturning moment.

FIG. 12 illustrates a traditional wind turbine blade profile designed purely for maximizing aerodynamic efficiency. FIG. 13 illustrates an exemplary wind turbine blade profile according to an embodiment of the disclosure, designed for maximizing energy capture for a fixed thrust overturning moment. The exemplary wind turbine blade 101 has a lower rotor solidity (ratio of total blade projected area and rotor swept area) than traditional wind turbine designs. In this case, a constant blade length is used for the comparison and the FIG. 13 design produces a higher energy capture per thrust overturning moment than the traditional design in FIG. 12.

Figure 14:
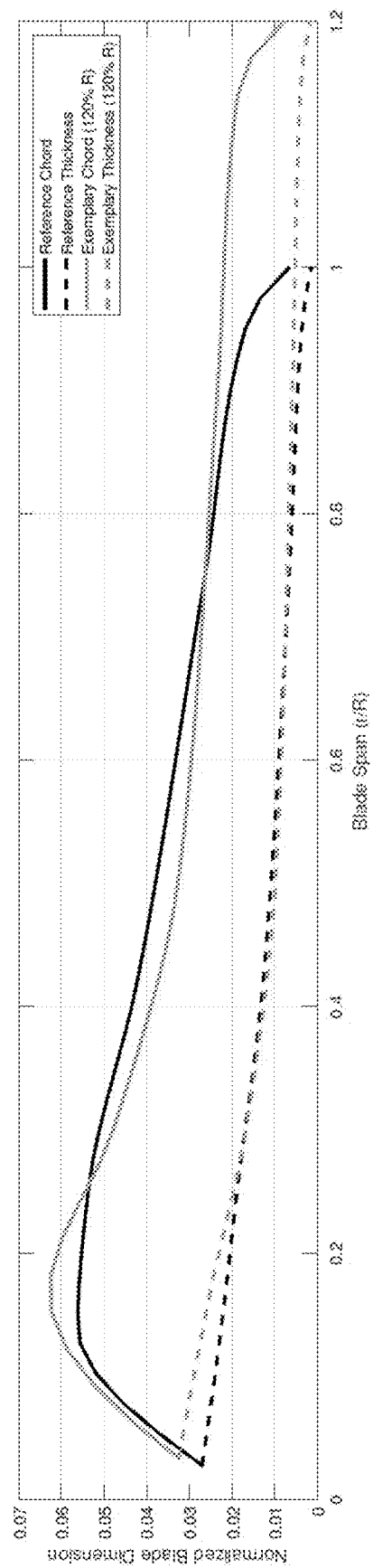
FIG. 14 shows a graph displaying a wind turbine blade's dimensions according to the present disclosure when increasing the blade length by 20% to increase energy capture.

FIG. 14 illustrates an embodiment of a wind turbine blade's dimensions according to the present disclosure when increasing the blade length by 20% to increase energy capture. This increase in blade length is for illustrative purposes and reveals a similar thickness profile compared to the traditional/reference design approach. To capture more energy for a fixed thrust overturning moment, the blades will have an optimal combination of lower loading profiles and longer blade lengths as illustrated in FIG. 14. The thrust-optimized design approach is less aerodynamically efficient, but captures energy over a larger area (proportional to blade length squared) such that the product of aerodynamic efficiency and swept area is higher for the thrust-optimized design approach while maintaining or reducing the thrust overturning moment.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A wind turbine comprising:
   a plurality of wind turbine blades attached to a hub, each blade having an inboard region and an outboard region, each blade having a first configuration of geometry, the first configuration including a geometry of the inboard region that provides an induction factor of between 0.1-0.25 and a geometry of the outboard region that provides an induction factor of between 0.15-0.33; and
   a tower extending from the hub to a tower base;
   wherein a first thrust overturning moment is applied to the tower base from the first configuration that is less or equal to a second thrust overturning moment corresponding to a second configuration of wind turbine blades having a geometry of the inboard region that provides an induction factor of 0.33 and a geometry of the outboard region that provides an induction factor of 0.33.

2. The wind turbine of claim 1, wherein the inboard region provides an induction factor of between 0.1-0.15 in the first configuration.

3. The wind turbine of claim 1, wherein the energy capture per thrust overturning moment applied to the tower base of the first configuration is greater than the second configuration.

4. The wind turbine of claim 3, wherein the energy capture per thrust overturning moment of the first configuration is at least 5% greater than the second configuration.

5. The wind turbine of claim 4, wherein the energy capture per thrust overturning moment of the first configuration is at least 10% greater than the second configuration.

6. The wind turbine of claim 5, wherein the energy capture per thrust overturning moment of the first configuration is at least 20% greater than the second configuration.

7. The wind turbine of claim 1, wherein the thrust overturning moment applied to the tower base of the first configuration is less than the second configuration for the same energy production.

8. The wind turbine of claim 7, wherein the thrust overturning moment applied to the tower base of the first configuration is at least 5% less than the second configuration for the same energy production.

9. The wind turbine of claim 8, wherein the thrust overturning moment applied to the tower base of the first configuration is at least 10% less than the second configuration for the same energy production.

10. The wind turbine of claim 9, wherein the thrust overturning moment applied to the tower base of the first configuration is at least 20% less than the second configuration for the same energy production.

11. The wind turbine of claim 1, wherein the tower base is a floating platform base for an offshore wind turbine.

12. The wind turbine of claim 1, wherein the tower base for a wind turbine having the first configuration is smaller than the tower base for a wind turbine having the second configuration.

13. The wind turbine of claim 1, wherein the plurality of wind turbine blades includes two, three, four or five blades.

14. A method of making a wind turbine comprising:
forming a wind turbine blade having an inboard region and an outboard region, configuring the geometry of the inboard region to provide an induction factor of between 0.1-0.25 and configuring the geometry of the outboard region to provide an induction factor of between 0.15-0.33; and
providing the wind turbine blade to a hub, the hub being attached to a tower, which is attached to a tower base;
wherein a first thrust overturning moment is applied to the tower base from a first configuration of the geometry of the inboard region and the geometry of the outboard region, the first thrust overturning moment being less than or equal to a second thrust overturning moment corresponding to a second configuration of wind turbine blades having a geometry of the inboard region that provides an induction factor of 0.33 and a geometry of the outboard region that provides an induction factor of 0.33.

15. The method of claim 14, wherein the energy capture per thrust overturning moment applied to the tower base of the first configuration is greater than the second configuration.

16. The method of claim 15, wherein the energy capture per thrust overturning moment of the first configuration is at least 5% greater than the second configuration.

17. The method of claim 16, wherein the energy capture per thrust overturning moment of the first configuration is at least 10% greater than the second configuration.

18. The method of claim 17, wherein the energy capture per thrust overturning moment of the first configuration is at least 20% greater than the second configuration.

19. The method of claim 14, wherein the thrust overturning moment applied to the tower base of the first configuration is less than the second configuration for the same energy production.

20. The method of claim 19, wherein the thrust overturning moment applied to the tower base of the first configuration is at least 5% less than the second configuration for the same energy production.

21. The method of claim 20, wherein the thrust overturning moment applied to the tower base of the first configuration is at least 10% less than the second configuration for the same energy production.

22. The method of claim 21, wherein the thrust overturning moment applied to the tower base of the first configuration is at least 20% less than the second configuration for the same energy production.

23. The method of claim 14, wherein the tower base is a floating platform base for an offshore wind turbine.

24. The method of claim 14, wherein the tower base for a wind turbine having the first configuration is smaller than the tower base for a wind turbine having the second configuration.

* * * * *